US012623548B2

(12) United States Patent
Ridenour et al.

(10) Patent No.: US 12,623,548 B2
(45) Date of Patent: May 12, 2026

(54) PREDICTIVE PREPARATION FOR ENERGY DISRUPTION EVENT

(71) Applicant: GM Global Technology Operations LLC, Detroit, MI (US)

(72) Inventors: Sabrina Elaine Ridenour, Novi, MI (US); Patricia M. Laskowsky, Ann Arbor, MI (US); Nolan Perry, Oak Ridge, TN (US); Aparna Dale, Novi, MI (US); Jason Villanueva, Henderson, NV (US); George Tyler Krusen, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 169 days.

(21) Appl. No.: 18/437,496

(22) Filed: Feb. 9, 2024

(65) Prior Publication Data

US 2025/0256582 A1     Aug. 14, 2025

(51) Int. Cl.
B60L 3/00 (2019.01)
B60L 58/13 (2019.01)
G05B 23/02 (2006.01)

(52) U.S. Cl.
CPC ............. B60L 3/0046 (2013.01); B60L 58/13 (2019.02); G05B 23/0243 (2013.01); B60L 2240/54 (2013.01)

(58) Field of Classification Search
CPC .... B60L 3/0046; B60L 58/13; B60L 2240/54; G05B 23/0243
See application file for complete search history.

(56) References Cited

U.S. PATENT DOCUMENTS

| | | | | |
|---|---|---|---|---|
| 9,085,238 | B2 * | 7/2015 | Sisk | B60L 58/16 |
| 10,017,039 | B1 * | 7/2018 | Colavincenzo | B60W 10/06 |
| 2015/0137752 | A1 | 5/2015 | Shinzaki et al. | |
| 2022/0379770 | A1 | 12/2022 | Salter et al. | |
| 2023/0024900 | A1 * | 1/2023 | Ayoola | B60L 55/00 |
| 2024/0067031 | A1 * | 2/2024 | Meroux | G06N 20/00 |
| 2024/0266842 | A1 * | 8/2024 | Munson | H01M 50/143 |

FOREIGN PATENT DOCUMENTS

| | | |
|---|---|---|
| DE | 102014223284 A1 | 5/2015 |
| DE | 102022112985 A1 | 12/2022 |

OTHER PUBLICATIONS

German Application No. 10 2024 108 808.7 filed Mar. 27, 2024; German Office Action dated Sep. 27, 2024; 3 pages.

* cited by examiner

*Primary Examiner* — Gertrude Arthur Jeanglaude
(74) *Attorney, Agent, or Firm* — CANTOR COLBURN LLP

(57) ABSTRACT

An energy storage system includes an energy distribution system. A battery system is connected to, and configured to provide energy to, the energy distribution system. The battery system includes an energy storage system and a controller. The controller includes a memory storing instructions for causing the vehicle to respond to receiving a notice of an expected energy disruption event at the controller by identifying a severity of the expected energy disruption event, a type of the expected energy disruption event, and a time until an occurrence of the expected energy disruption event using the controller, determining a target charge level of the vehicle battery system based on at least one of the severity, type, and time until the expected energy disruption event and charging the vehicle battery system to the target charge level.

20 Claims, 5 Drawing Sheets

100

200

| Event | Event | | Level |
| --- | --- | --- | --- |
| | Advisory | Watch | Warning |
| Snow | Ignore | ✓ | ✓ |
| Fire | • • • | • • • | ✓ |
| Flood | • • • | Confirm | Confirm |
| Tornado | • • • | • • • | • • • |
| Wind | • • • | • • • | • • • |
| Hurricane | • • • | • • • | • • • |

| Weather Event | Severity | | |
|---|---|---|---|
| | Advisory | Watch | Warning |
| Winter Weather | TCL | TCL | 100% |
| Fire | ••• | ••• | ••• |
| Hurricane | ••• | 100% | ••• |
| Flood | ••• | ••• | ••• |
| Tornado | ••• | ••• | ••• |
| Tropical Storm | ••• | TCL | ••• |
| Wind | ••• | TCL | TCL |

FIG. 6

PREDICTIVE PREPARATION FOR ENERGY DISRUPTION EVENT

INTRODUCTION

The subject disclosure relates to providing stored energy from a vehicle to a building, and more particularly to a system and process for preparing a vehicle to provide energy to a building ahead of an expected upcoming energy disruption event.

Electric vehicles typically include large capacity energy storage systems (e.g., batteries) to ensure that the vehicle is capable of meeting or exceeding desired ranges. In some configurations, the large capacity energy storage systems can be configured to allow energy to be transferred from the vehicle to an exterior system, such as a building energy system, in addition to receiving energy from exterior systems as the vehicle does while charging.

Accordingly, it is desirable to identify when a building system may benefit from receiving energy from a vehicle and to prepare the vehicle to transfer energy from the vehicle battery to the building system.

SUMMARY

In one exemplary embodiment a method for providing energy to an energy distribution system includes receiving a notice of an expected energy disruption event at a battery system controller of a battery system of a vehicle, identifying a severity of the expected energy disruption event, a type of the expected energy disruption event, and a time until an occurrence of the expected energy disruption event using the battery system controller, determining a target charge level of the battery system based on at least one of the severity, type, and time until the expected energy disruption event, and charging the battery system to the target charge level.

In addition to one or more of the features described herein, the method further includes placing the vehicle in a vehicle-to-building mode in response to the battery system reaching the target charge level before the expected energy disruption event.

In addition to one or more of the features described herein the method further includes transferring energy from the vehicle to a building in response to the energy disruption event occurring.

In addition to one or more of the features described herein, the building is a low occupancy residential building.

In addition to one or more of the features described herein, the method further includes responding to an occurrence of the expected energy disruption event by transferring energy from the battery system to a building energy system.

In addition to one or more of the features described herein, determining a target charge level comprises accessing a locally stored lookup table, the locally stored lookup table correlating the type of the expected energy disruption event and the severity of the expected energy disruption event with a set of target charge levels.

In addition to one or more of the features described herein, the locally stored lookup table further includes user defined flags corresponding to each severity of each type of energy disruption event, and wherein a user defined flag determines whether charging the vehicle to the target charge level occurs automatically, occurs after a user notification and authorization, or does not occur.

In addition to one or more of the features described herein, the target charge defined in the locally stored lookup table are locked for vehicle operators.

In addition to one or more of the features described herein, the method further includes updating the time until the expected energy disruption event in response to receiving an updated notice of the expected energy disruption event.

In addition to one or more of the features described herein, receiving the notice of an expected energy disruption event comprises receiving information from a central server, and wherein the central server is in communication with at least one exterior energy disruption event monitoring service.

In addition to one or more of the features described herein, the expected energy disruption event is a weather event, and the notice of the expected energy disruption event is based at least in part on a weather forecast.

In addition to one or more of the features described herein, the method further includes adjusting a charging rate of the vehicle battery system based at least in part on the time until the expected energy disruption event and the target charge level.

In another exemplary embodiment an energy storage system includes. An energy distribution system. A battery system is connected to, and configured to provide energy to, the energy distribution system. The battery system includes an energy storage system and a controller. The controller includes a memory storing instructions for causing a vehicle to respond to receiving a notice of an expected energy disruption event at the controller by identifying a severity of the expected energy disruption event, a type of the expected energy disruption event, and a time until an occurrence of the expected energy disruption event using the controller, determining a target charge level of the battery system based on at least one of the severity, type, and time until the expected energy disruption event and charging the battery system to the target charge level.

In addition to one or more of the features described herein, the memory further stores instructions for causing the vehicle to enter in a vehicle-to-building mode in response to the battery system reaching the target charge level before the expected energy disruption event.

In addition to one or more of the features described herein, the memory further stores instructions for causing a transfer of energy from the vehicle to the building in response to the expected energy disruption event occurring.

In addition to one or more of the features described herein, determining a target charge level comprises accessing a locally stored lookup table, the locally stored lookup table correlating the type of the expected energy disruption event and the severity of the expected energy disruption event with a set of target charge levels.

In addition to one or more of the features described herein, a locally stored lookup table further includes user defined flags corresponding to each severity of each type of energy disruption event, and wherein a user defined flag determines whether charging the battery system of the vehicle to the target charge level occurs automatically, occurs after a user notification and authorization, or does not occur.

In addition to one or more of the features described herein, receiving the notice of an expected energy disruption event comprises receiving information from a central server, and wherein the central server is in communication with at least one exterior energy disruption event monitoring service.

In addition to one or more of the features described herein, the energy storage system further includes adjusting a charging rate of the battery system based at least in part on the time until the expected energy disruption event and the target charge level.

In addition to one or more of the features described herein, the energy storage system is one of a vehicle and a component of a vehicle, and wherein the energy distribution system includes a connection to at least one electric propulsive motor for the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 6 depicts a lookup table of target charge levels for various exemplary expected energy disruption events.

DETAILED DESCRIPTION

Figure 1:
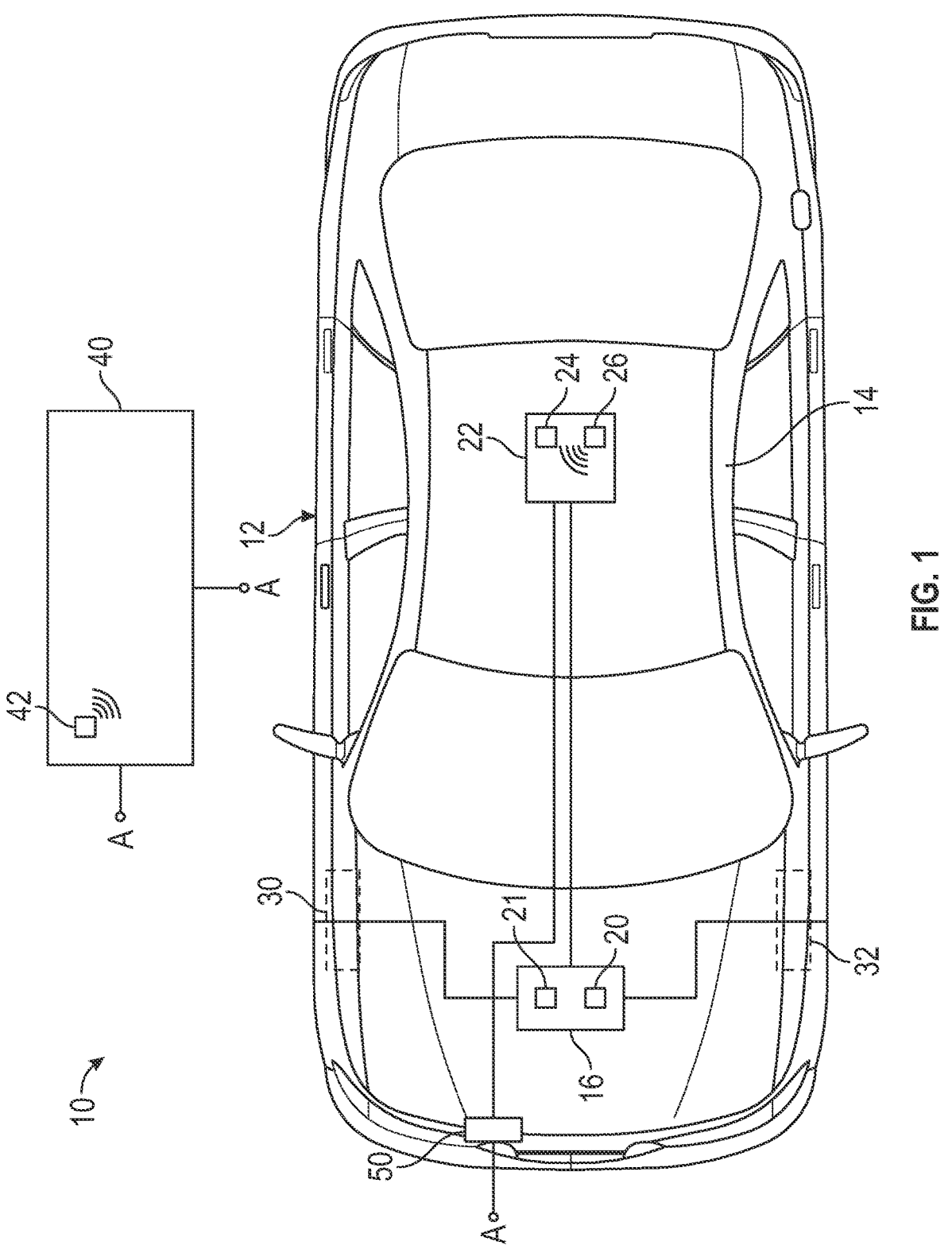
FIG. 1 is a top view of a motor vehicle including a battery assembly or system and a battery charging system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment methods, devices and systems are provided for controlling charging of a battery system, such as an electric vehicle or hybrid vehicle battery system. The embodiments may be applicable to various charging processes, such as conventional charging and DC fast charging (DCFC).

In an embodiment, an electric vehicle includes a large capacity energy storage system, such as a battery. The large capacity energy storage system can be configured to receive energy from an exterior system through a charge port, or to return energy to the exterior system through the charge port. A battery system controller (alternately referred to as a controller) controls the charging or discharging operations of the large capacity energy system.

The controller is in communication with one or more exterior systems and is configured to receive a notification of an expected event that may disrupt the flow of energy to the exterior system connected to the charge port. These events are referred to herein as "expected energy disruption events", and can include any expected events that may result in power loss or disruption to the connected exterior system. In some examples, the expected energy disruption events include weather (e.g., wind storms, blizzards, floods, etc.), scheduled blackouts/rolling blackouts, and/or any similar type of event.

Also included on the controller is a memory configured to cause the controller to respond to receiving a notification of the expected energy disruption event by identifying a target charge level for the battery system based on the expected energy disruption event type and severity and charging the battery system to the target charge level ahead of the expected energy disruption event. Once charged to the target charge level, the controller places the battery system in a vehicle-to-building (V2H) mode and the battery system is prepared to provide energy to the building on occurrence of the expected energy disruption event. When the expected energy disruption event occurs, the vehicle provides power from the battery system to the building energy distribution system, thereby allowing electrical systems within the building to continue operating throughout the energy disruption event.

Embodiments described herein present numerous advantages and technical effects. In some examples, the system is capable of anticipating inclement weather with a high risk of causing a power outage and aiding the customer in assuring their vehicle is as charged as possible before the arrival of the inclement weather. In addition, by using this system the vehicle is prepared to trigger a V2H discharge session immediately, and the user is not required to manually set up the V2H session after the energy disruption event has already occurred or is ongoing.

The embodiments are not limited to use with any specific vehicle and may be applicable to various contexts. For example, embodiments may be used with automobiles, trucks, aircraft, construction equipment, farm equipment, automated factory equipment and/or any other device or system including large capacity energy storage systems that are able to return energy to an exterior energy system. In non-vehicle examples, the systems and processes function identically and the terms "vehicle to building" and "V2H" encompass similar systems for providing energy from a component with a large capacity energy storage system to an exterior energy system. As used throughout, the terms "vehicle to building" and "V2H" are not limited to vehicle based applications.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be an electrically powered vehicle (EV) or a hybrid vehicle. In an embodiment, the vehicle 10 is an electric vehicle including at least one electric motor assembly. For example, the propulsion system 16 includes a first electric motor 20 and a second electric motor 21. The motors 20 and 21 may be configured to drive wheels 30, 32 on opposing sides of the vehicle 10. Any number of motors positioned at various locations may be used.

The vehicle 10 includes a battery system 22, which may be electrically connected to the motors 20 and 21 and/or other components, such as vehicle electronics. The battery system 22 may be configured as a rechargeable energy storage system (RESS).

In an embodiment, the battery system 22 includes a battery assembly such as a high voltage battery pack 24. In alternate examples, alternative large capacity energy storage systems may be utilized in the same manner as the high voltage battery pack 24. The battery system 22 may also include RESS controller, referred to herein as controller 26.

The controller 26 is configured to communicate with one or more exterior systems, including a controller 42 of an exterior energy source 40. In some examples, the controller 26 is also able to communicate with one or more remote data systems via internet connections.

The vehicle 10 may include a charging system that can be used to charge the battery pack 24 and/or used for supplying power from the battery pack 24 to charge another energy storage system (e.g., vehicle-to-building charging). The charging system can, in some examples, include an onboard charging module (OBCM) that is electrically connected to a charge port 50. The charge port 50 can be connected to the exterior energy source 40 to facilitate the exchange of electrical energy.

In an embodiment, the vehicle 10 includes a charging control system within the controller 26 configured to identify upcoming expected energy disruption events for the exterior energy source 40 and place the battery system 22 in a state where the battery system 22 is prepared to transfer energy from the vehicle 10 to the exterior energy source 40 during an energy disruption event. The controller 26 is configured to receive information identifying the expected energy disruption event via any established communication. The information can either be a direct instruction from a central data server (e.g., a backend source), or indirect information from which the controller 26 infers an expected energy disruption event is pending (e.g., a weather report, rolling blackout schedule, etc.).

Figure 2:
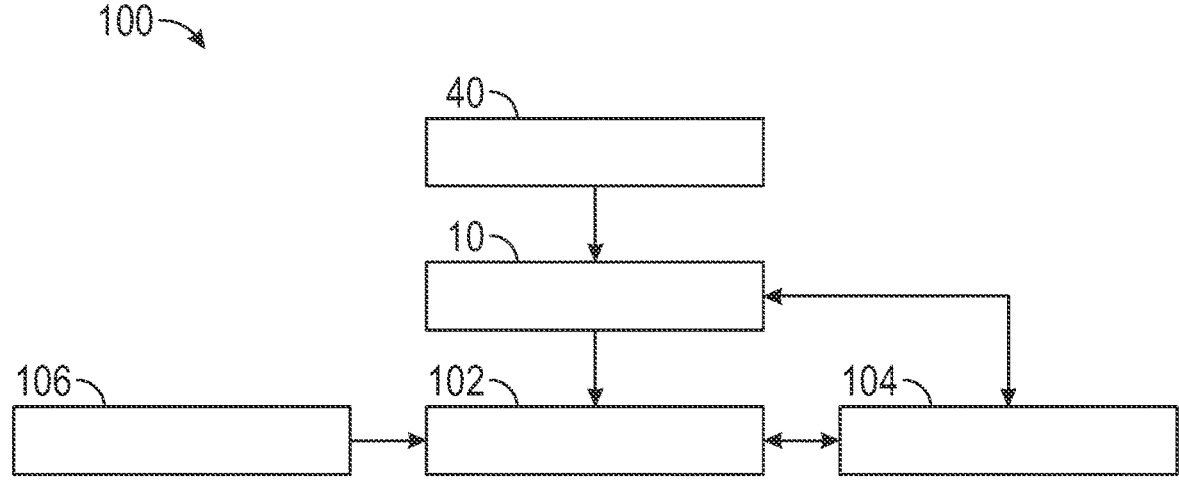
FIG. 2 depicts a block diagram of communications between systems for enabling a vehicle to prepare for an expected energy disruption event.

With continued reference to FIG. 1, FIG. 2 depicts a block diagram 100 of communications between systems, with the communications enabling the vehicle 10 to prepare for an expected energy disruption event. In the example, the vehicle 10 is in reciprocal (two-way) communication with an exterior energy source 40 (e.g., a home charging unit), a remote data server 102, and a customer controlled application 104 (e.g., a vehicle/charging control phone application.) The remote data server 102 is also in reciprocal communication with the customer controlled application 104, and in a one way communication with an information service 106. The information service 106 is able to provide either direct notification of an upcoming expected energy disruption event (e.g. a planned blackout) or provide information from which an upcoming expected energy disruption event may be derived (e.g., a weather forecasting service). In some examples, the one way communication between the remote data server 102 and the information service 106 can be preceded by a request for information initiated by the remote data server 102. In other examples, the one way communication between the remote data server 102 and the information service 106 can be a continuous or periodic stream of information provided by the information service 106 (e.g., a weather forecast subscription).

The remote data server 102 is configured to, among other functions, analyze information received from the information service 106 and identify any expected energy disruption events, as well as any corresponding information that may impact the likelihood or severity of an identified expected energy disruption event. By way of example, the remote data server 102 may receive a weather forecast and identify an upcoming weather event as well as a time until the weather event and an expected severity of the weather event.

Once identified, the expected energy disruption event information is provided to either the vehicle 10 directly via the two way communication (see FIG. 2) connecting the vehicle 10 to the remote data server 102 or indirectly through the customer controlled application 104. Upon receipt of the information identifying an upcoming expected energy disruption event, the controller 26 in the vehicle 10 consults a lookup table 200 (see FIG. 3, discussed herein) to determine how, and when, to respond to the identified expected energy disruption event.

Figure 3:
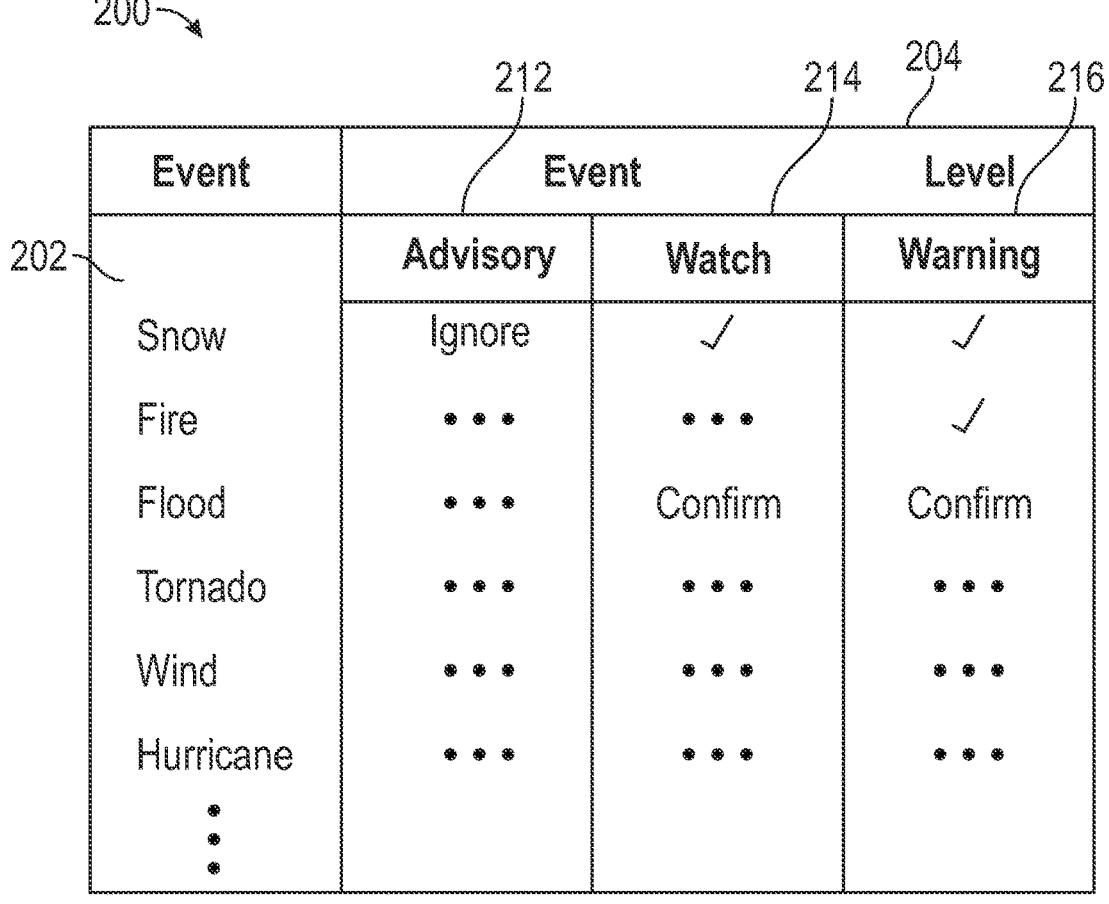
FIG. 3 depicts a lookup table of vehicle responses to an identified expected energy disruption event.

With continued reference to FIGS. 1 and 2, FIG. 3 illustrates the lookup table 200 in one example. In some examples, the lookup table 200 can be locally stored within a controller of the vehicle 10. The lookup table 200 includes a listing of possible events 202 and a corresponding chart 204 of severities of the possible events 202. In the example chart 204, the severities are broken down into three severity categories 212, 214, 216: advisory, watch, and warning. Alternative examples can include more, less or different severity categories 212, 214, 216 depending on the specific implementation. Within each category the corresponding expected event of the possible events 202 is assigned one of three possibilities. Each of the entries includes a default possibility, however the possibilities can be configured by the end user to meet the end user's desired preferences. In one example, the default possibility is to require confirmation from the user for every possible event 202 until the user has indicated to the contrary.

In a first case, the event and the severity category are assigned "ignore". When a possible event 202 and severity category 212, 214, 216 are assigned "ignore", the controller 26 does not prepare to provide power to the exterior energy source 40 as the vehicle 10 operator has previously indicated that they do not wish to prepare to provide power to the exterior source 40 in this event.

In a second case, the possible event 202 and the severity category 212, 214, 216 are assigned "confirm". When a possible event 202 and severity category 212, 214, 216 are assigned confirm, the controller 26 communicates through the customer controlled application 104 with the end user to confirm whether the user wishes prepare the vehicle 10 to provide power to the exterior energy source 40 when the expected energy disruption event (possible event 202) occurs. The controller 26 then follows the user's selection. When the user declines to provide a selection and/or does not respond to the notification within a predefined time period, the controller 26 defaults to preparing the vehicle 10 to provide energy to the exterior energy source 40.

In a third case, the possible event 202 and the severity category 212, 214, 216 are assigned to automatically prepare the battery system 22 to provide power to the exterior energy source 40 in preparation for the occurrence of the expected energy disruption event without input from the user.

While the exemplary possible events 202 illustrated in the lookup table 200 includes snow, fire, flood, tornado, wind and hurricanes, it is understood that this list is exemplary in nature and not exhaustive. Practical implementation may include more, or less, possible events 202 and the possible events 202 may not be limited to weather events.

Figure 4:
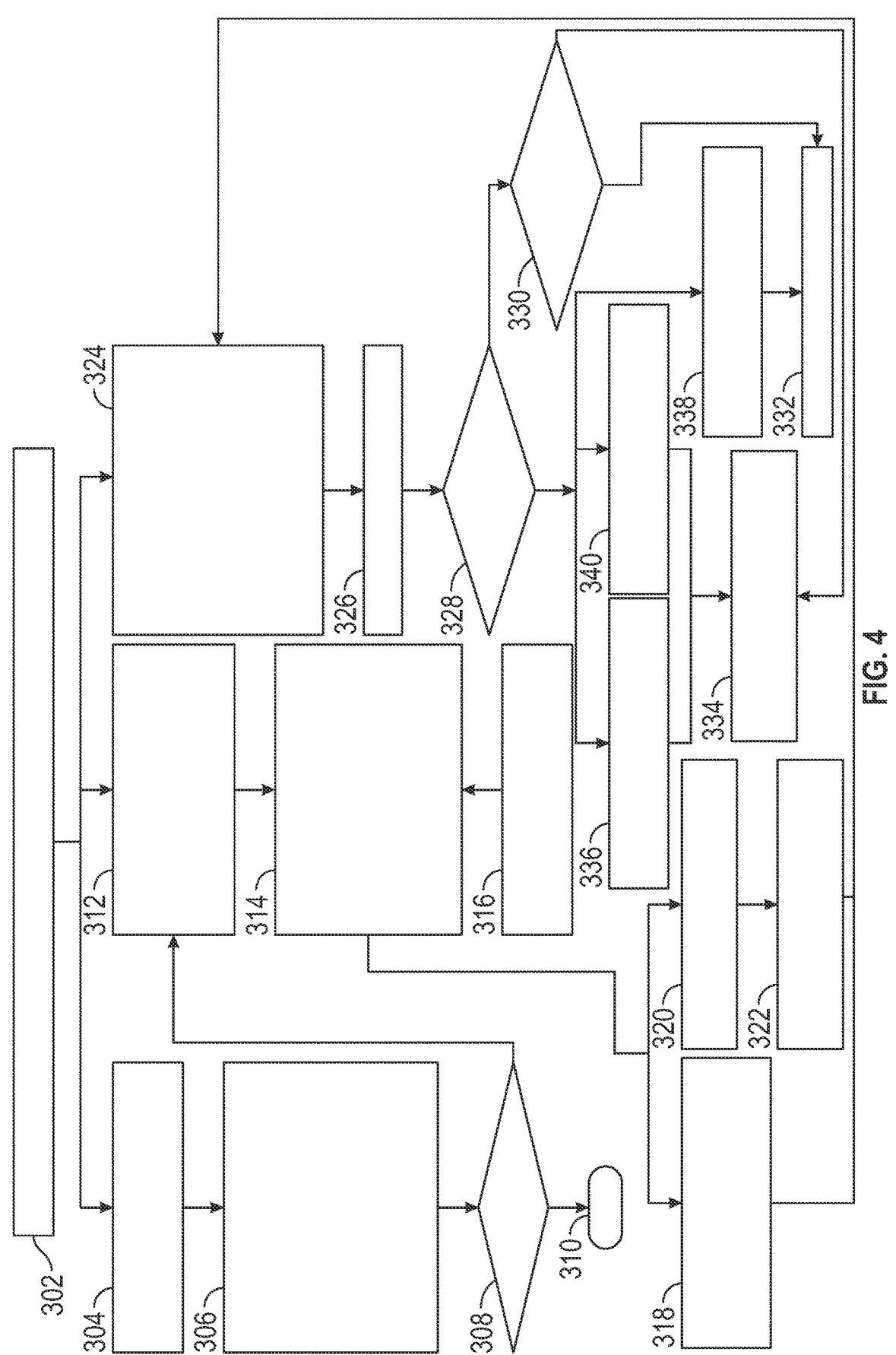
FIG. 4 depicts a process for responding to an identified upcoming energy disruption event.
Figure 5:
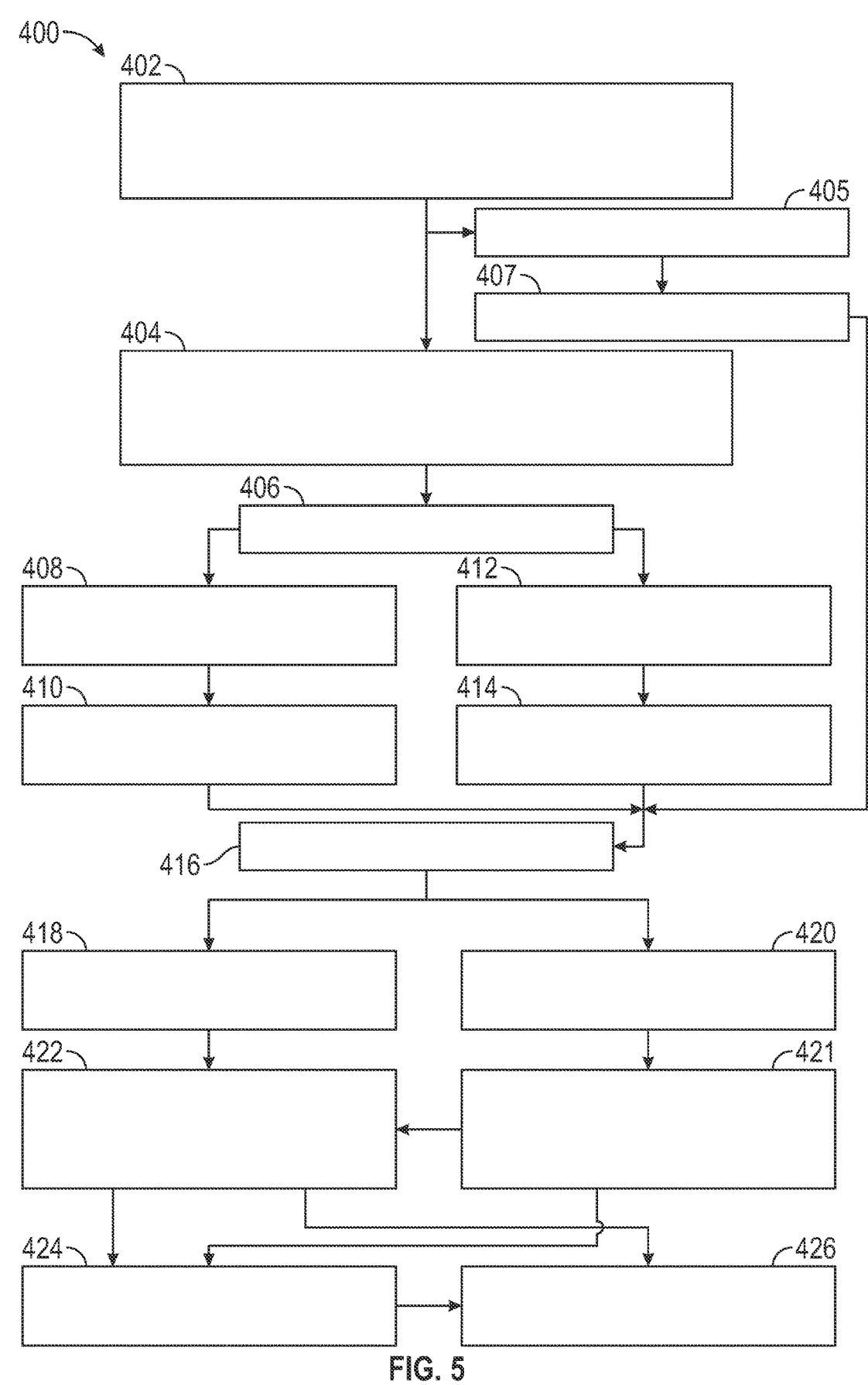
FIG. 5 depicts an internal controller process for charging a vehicle battery to prepare for an identified upcoming energy disruption event.

With continued reference to FIGS. 1-3, FIG. 4 illustrates a process 300 for responding to an identified upcoming energy disruption event where the lookup table 200 of FIG. 3 indicates 'confirm' for the event. The example expected energy disruption event of FIG. 4 is a weather event, however the same process would be applied for any other type of expected energy disruption event. Except where indicated otherwise, all decisions and processes are performed by the controller 26 within the vehicle battery system 22.

Initially, the controller 26 receives a notification of a forecasted weather event that includes a probability of energy disruption at block 302. The forecasted weather event is, in one example, a service report of a severe weather event from a national weather service. In alternative examples, the report can be from any other forecasting service including private services, public services, and manual reports entered at the remote data server 102. Upon receiving the notification, the controller 26 identifies whether the expected energy disruption is expected to occur more than 24 hours from the present time, within 24 hours but longer than a time required to prepare the vehicle for a V2H mode (alternatively phrased as a "reaction time"), or shorter than the reaction time.

When the expected energy disruption event is longer than 24 hours away, the process 300 proceeds to block 304 where the process checks to ensure the expected energy disruption event is greater than 24 hours away, and then to block 306. At block 306, the controller 26 provides a notification to the end user through the customer controlled application 104 that an energy disruption event is expected to occur within X days. The controller 26 then requests that the end user confirm if the vehicle 10 settings should be overridden by the process 300 at a check 308. In one example, this confirmation is performed by consulting the lookup table 200. If the end user indicates that the process 300 should not be overridden, the process 300 ends at block 310, and the vehicle 10 is not configured to provide energy to the exterior energy system 40.

If the end user indicates that the process 300 should be overridden at check 308, then the process 300 waits until 24 hours before the expected energy disruption event and proceeds to block 312. Similarly, when the initial receipt of the notification occurs within 24 hours of the expected energy disruption event and further away than the reaction time, the process 300 moves from the initial block 302 to block 312.

At block 312, the process 300 identifies that the expected energy disruption event is within 24 hours away, but further away than the reaction time, and proceeds to block 314.

At block 314, the process 300 begins a countdown timer to the edge of the reaction time. By way of example, if it will take 2 hours to prepare the vehicle 10 for the expected energy disruption event, and the event is 24 hours away, a 22 hour countdown timer is initiated. During the countdown, the process 300 additionally monitors vehicle statuses 316 and maintains communication with the remote data server 102 and monitors for updates to the expected arrival time of the expected energy disruption event.

As the countdown continues, the duration of the countdown is continuously updated based on the vehicle 10 states from block 316 and any updated arrival time of the expected energy disruption event at a block 318. The updating is continuously iterated until the reaction time is reached, when the process 300 proceeds to block 324.

If communication with the remote data server 102 is lost or interrupted at block 320, the process 300 continues the countdown to the reaction time using the most recently received information at block 322.

At block 324, when the reaction time is reached and/or when initial notification occurs within the reaction time, the process 300 notifies the customer an energy disruption event is near and instructs the end user to plug the charge port 50 of the vehicle 10 into the exterior energy source 40, and the vehicle 10 is connected to the exterior energy source 40 at block 326.

Once connected, the process 300 checks to determine if approval is needed at a check 328. The check 328 is performed by consulting the lookup table 200, and identifying the type and severity 212, 214, 216 of the expected energy disruption event. If no approval is needed, a second check 330 occurs to determine the default action to be performed. If the lookup table 200 indicates that the default action is to ignore the expected energy disruption event, the process 300 takes no further action at block 332. If the default action is to activate the V2H systems and prepare to provide power to the building, the process 300 proceeds to block 334, where the controller 26 initiates the V2H response (see: FIG. 4) at block 334.

If approval is needed at check 328, the process 300 provides a notification to the end user through the customer controlled application 104, and the customer either accepts the reaction (block 336) declines the reaction (block 338) or does not respond (block 340). When the user either accepts or does not respond, the controller initiates the V2H response at block 334. When the user declines at block 338, the process 300 takes no action, at block 332.

With continued reference to FIGS. 1-4, FIG. 5 illustrates the process 400 for initiating the V2H reaction upon completion of the process 300 illustrated in FIG. 4. Upon authorization of and initiation of the V2H process 400 at block 402, if the vehicle 10 standard charging operation is set to a delayed mode via authorization (block 402), then the controller 26 continues to calculate the time durations to schedule charging of the battery system 22 to the estimated charge levels at block 404. Upon authorization of and initiation of the V2H process 400 at block 402, if the vehicle 10 standard charging operation is set to be immediate charge mode (block 405), then the V2H process 400 charges at block 407 and proceeds to block 416.

After the durations to each charge level have been determined, the process 400 determines the target charge level for the battery system 22, with the target charge level corresponding to the type of possible event 202 and severity category 212, 214, 216 of the expected energy disruption event at block 406. In one example, the target charge level is determined using a second lookup table 500, illustrated in FIG. 6. In some examples, the second lookup table 500 can be locally stored within a controller of the vehicle 10. The second lookup table 500 includes the type of possible event 202 and severity category 212, 214, 216 of the first lookup table 200, with the entries for each type of possible event 202 and severity category 212, 214, 216 indicating a target charge level (e.g. a targeted state of charge) of the battery system 22. The target charge level is an amount of charge within the battery system 22 required to ensure that the battery system 22 can provide sufficient power to the exterior energy source 40 for an expected duration of the expected energy disruption event. In one example, the entries in the second lookup table 500 are set by the remote data server and cannot be changed by an end user. This configuration is referred to as being locked for vehicle operators.

When the current state of charge of the battery system 22 is greater than the target charge level at block 408, the controller 26 causes the process 400 to cease charging and proceeds to wait for a time until the expected energy disruption event to occur has elapsed at block 410.

When the current state of charge of the battery system 22 is less than the target charge level, block 412, the controller 26 causes the battery system 22 to initiate charging through the charge port 50 and block 414, and the charging continues until either the target charge level is reached, or the time until the expected energy disruption event has elapsed.

At block 416 the time until the expected energy disruption event elapses. In the event that the expected energy disruption event has not occurred when the time elapses, the process 400 branches into two possible routes, depending on whether the target charge level has been reached (block 418) or has not been reached (block 420). When the target charge level has been reached, the controller 26 causes the vehicle 10 to prepare to enter a V2H session, and waits in standby until either the expected energy disruption event occurs, or the controller 26 is informed that the expected energy disruption event will not occur at block 422.

When the battery system 22 is not charged to the full charge level (block 420), the controller 26 causes the battery system 22 to continue charging until the target charge level is reached (block 421), and then proceeds to block 422 when the target charge level is reached, and the expected energy disruption event has not yet occurred. Should the energy disruption event occur while the battery system 22 is still charging to the target charge level, an end user/vehicle 10 operator will manually trigger the V2H operations and the process 400 moves to block 422.

Once switched into the V2H mode, the controller 26 causes the battery system 22 to wait for an occurrence of the expected energy disruption event in standby mode. When the expected energy disruption event occurs, the controller 26 causes the battery system 22 to discharge energy from the vehicle 10 to the exterior energy source 40 for either a duration of the energy disruption event or until a minimum battery system charge 22 is reached at block 424, after which the process returns to standard charging operations at block 426.

When the expected energy disruption event does not occur, or is downgraded such that no disruption is expected, the controller 26 causes the battery system 22 to bypass block 424 and go straight to block 426.

While illustrated and described above with regards to a generic energy distribution systems, it is appreciated that one particularly useful embodiment utilizes a passenger vehicle as the vehicle 10, and a single family residential house (or other low occupancy residential building) as the building including the exterior energy source 40. This particular embodiment allows an end user to utilize the high capacity energy storage contained within their vehicle 10 to provide emergency power to their home during a weather related blackout. Further the process described herein allows for this function to be performed seamlessly without requiring the user to activate the system, or perform other administrative tasks required to enable the system after an energy disruption to their home has already occurred.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for providing energy to an energy distribution system, the method comprising:
    receiving a notice of an expected energy disruption event at a battery system controller of a battery system of a vehicle;
    identifying a severity of the expected energy disruption event, a type of the expected energy disruption event, and a time until an occurrence of the expected energy disruption event using the battery system controller;
    determining a target charge level of the battery system based on at least one of the severity, type, and time until the expected energy disruption event;
    charging the battery system to the target charge level;
    placing the vehicle in a vehicle-to-building mode in response to the battery system reaching the target charge level before the expected energy disruption event; and
    responsive to the expected energy disruption event occurring, discharging energy from the vehicle to an exterior energy source for one of a duration of the energy disruption event or until a minimum battery system charge is reached.

2. The method of claim 1, further comprising transferring energy from the vehicle to a building in response to the energy disruption event occurring.

3. The method of claim 2, wherein the building is a low occupancy residential building.

4. The method of claim 1, further comprising responding to an occurrence of the expected energy disruption event by transferring energy from the battery system to a building energy system.

5. The method of claim 1, wherein determining a target charge level comprises accessing a locally stored lookup table, the locally stored lookup table correlating the type of the expected energy disruption event and the severity of the expected energy disruption event with a set of target charge levels.

6. The method of claim 5, wherein the locally stored lookup table further includes user defined flags corresponding to each severity of each type of energy disruption event, and wherein a user defined flag determines whether charging the vehicle to the target charge level occurs automatically, occurs after a user notification and authorization, or does not occur.

7. The method of claim 5, wherein the target charge defined in the locally stored lookup table are locked for vehicle operators.

8. The method of claim 1, further comprising updating the time until the expected energy disruption event in response to receiving an updated notice of the expected energy disruption event.

9. The method of claim 1, wherein receiving the notice of an expected energy disruption event comprises receiving information from a central server, and wherein the central server is in communication with at least one exterior energy disruption event monitoring service.

10. The method of claim 1, wherein the expected energy disruption event is a weather event, and the notice of the expected energy disruption event is based at least in part on a weather forecast.

11. The method of claim 1, further comprising adjusting a charging rate of vehicle battery system based at least in part on the time until the expected energy disruption event and the target charge level.

12. An energy storage system comprising:

an energy distribution system;

a battery system connected to, and configured to provide energy to, the energy distribution system, the battery system being disposed in a vehicle and including an energy storage system and a controller, and wherein the controller includes a memory storing instructions for causing the vehicle to respond to receiving a notice of an expected energy disruption event at the controller by identifying a severity of the expected energy disruption event, a type of the expected energy disruption event, and a time until an occurrence of the expected energy disruption event using the controller, determining a target charge level of the battery system based on at least one of the severity, type, and time until the expected energy disruption event and charging the battery system to the target charge level, the controller being further configured to place the vehicle in a vehicle-to-building mode in response to the battery system reaching the target charge level before the expected energy disruption event, and responsive to the expected energy disruption event occurring, discharging energy from the vehicle to an exterior energy source for one of a duration of the energy disruption event or until a minimum battery system charge is reached.

13. The energy storage system of claim 12, wherein the memory further stores instructions for causing the vehicle to enter in a vehicle-to-building mode in response to the battery system reaching the target charge level before the expected energy disruption event.

14. The energy storage system of claim 13, wherein the memory further stores instructions for causing a transfer of energy from the battery system to the building in response to the expected energy disruption event occurring.

15. The energy storage system of claim 12, wherein determining a target charge level comprises accessing a locally stored lookup table, the locally stored lookup table correlating the type of the expected energy disruption event and the severity of the expected energy disruption event with a set of target charge levels.

16. The energy storage system of claim 15, wherein the locally stored lookup table further includes user defined flags corresponding to each severity of each type of energy disruption event, and wherein a user defined flag determines whether charging the battery system to the target charge level occurs automatically, occurs after a user notification and authorization, or does not occur.

17. The energy storage system of claim 12, wherein receiving the notice of an expected energy disruption event comprises receiving information from a central server, and wherein the central server is in communication with at least one exterior energy disruption event monitoring service.

18. The energy storage system of claim 12, further comprising adjusting a charging rate of the battery system based at least in part on the time until the expected energy disruption event and the target charge level.

19. The energy storage system of claim 12, wherein the energy storage system is one of a vehicle and a component of a vehicle, and wherein the energy distribution system includes a connection to at least one electric propulsive motor for the vehicle.

20. A method for providing energy to an energy distribution system, the method comprising:

receiving a notice of an expected energy disruption event at a battery system controller of a battery system of a vehicle;

identifying a severity of the expected energy disruption event, a type of the expected energy disruption event, and a time until an occurrence of the expected energy disruption event using the battery system controller;

determining a target charge level of the battery system based on at least one of the severity, type, and time until the expected energy disruption event, the determination including accessing a locally stored lookup table, the locally stored lookup table correlating the type of the expected energy disruption event and the severity of the expected energy disruption event with a set of target charge levels and wherein the locally stored lookup table further includes user defined flags corresponding to each severity of each type of energy disruption event, and wherein a user defined flag determines whether charging the vehicle to the target charge level occurs automatically, occurs after a user notification and authorization, or does not occur;

charging the battery system to the target charge level;

placing the vehicle in a vehicle-to-building mode in response to the battery system reaching the target charge level before the expected energy disruption event; and transferring energy from the vehicle to a building in response to the energy disruption event occurring.

* * * * *